2,794,054
α-CHLOROMETHYLBENZHYDRYL ETHERS

W E Craig and Elwood Y. Shropshire, Philadelphia, Pa., and Harold F. Wilson, Moorestown, N. J., assignors to Rohm & Haas Company, Philadelphia, Pa., a corporation of Delaware No Drawing. Application October 5, 1953, Serial No. 384,323

5 Claims. (Cl. 260—611)

This invention deals with alkyl α-chloromethylbenzhydryl ethers and with a process for their preparation. These are novel compounds which are useful as miticides and as chemical intermediates. They have the general structure

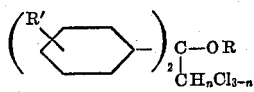

wherein R' is hydrogen, fluorine, chlorine, bromine, or an alkyl group of not over four carbon atoms, or an alkoxy group of not over four carbon atoms, R is a non-tertiary alkyl group of not over four carbon atoms or a neutral, substituted alkyl group, and $n$ is an integer from one to two. This invention also deals with an advantageous process by which these ethers may be prepared. It is also concerned with a process wherein they are applied to plants to control mites thereon.

The process for preparing the above compounds comprises reacting chlorine and an ethylenic compound of the formula

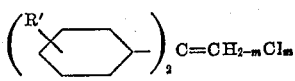

wherein R' has the significance stated above and $m$ is a number from zero to one, in the presence of an alcohol, ROH, wherein R is a primary or secondary alkyl group of not over four carbon atoms. The alcohol is best used in excess. The reaction is readily carried out by taking up a said ethylenic compound in a said alcohol and passing chlorine into the mixture thereof at 20° to 60° C. It has also been found that in place of methanol, ethanol, propanol, or butanol there may be used chloroethanol, a chloropropanol, or a chlorobutanol. Other neutral substituents may be present, such as ether, cyano, or bromine. Likewise cyclohexanol and other liquid alicyclic alcohols can be used. The product is conveniently separated as a residue and may be purified by extraction, charcoaling, recrystallization, or other conventional step.

Instead of adding chlorine directly to the mixture of alcohol and ethylenic compound, chlorine may be used in the form of an organic hypochlorite, tert-butyl hypochlorite being particularly convenient for this purpose.

The above ethylenic compounds are available, as is known, from the dehydrohalogenation of chloroethanes with one more chlorine atom than appears in the ethylenic compounds. Thus there may be taken compounds of the structure

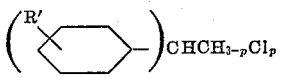

where $p$ has a value of one to two and R' has the same significance as above. Each phenyl ring may contain more than one halogen, alkyl or alkoxy group or combination of these. Thus there may be used diphenyldichloroethane, diphenylchloroethane, or bis(4-chlorophenyl)-, bis(4-fluorophenyl)-, bis(bromophenyl)-, bis- (methylchlorophenyl)-, ditolyl-, bis(ethylphenyl)-, bis(butylphenyl)-, bis(methoxyphenyl)-, and the like dichloroethanes, or chloroethanes.

Dehydrohalogenation is readily accomplished by heating a bisphenylchloroethane with a strong base such as sodium or potassium hydroxide in the presence of an alcohol, such as methyl, ethyl, propyl, or butyl alcohol. Temperatures from about 60° to 125° C. are generally used. With the preferred alcohol, butyl alcohol, reaction temperatures are conveniently 100° to 115° C. The alkali metal chloride formed and any excess base are washed away with water and the dehydrohalogenated product is obtained upon stripping.

A typical example of preparing an ethylenic compound follows.

A solution was prepared from 230 parts of 1,1-bis(4-chlorophenyl)-2,2-dichloroethane and 134 parts of n-butyl alcohol by stirring and warming a mixture thereof. Thereto was added 80 parts of an aqueous 50% sodium hydroxide solution. The resulting mixture was stirred and heated under reflux for 3.5 hours. Heating was discontinued and 120 parts of water added with good stirring. The mixture was then allowed to stand with formation of layers. The aqueous layer was drawn off and discarded. The organic layer was heated under reduced pressure with distillation of butyl alcohol. The residue was taken up in 190 parts of methanol and 45 parts of acetone and the solution therein was cooled to 5° C. with formation of a solid phase. This was filtered off and dried at 40°–50° C. for 12 hours. The yield was 150 parts of 1,1-bis(chlorophenyl)-2- chloroethylene.

By the same procedure there may be prepared other bis-(phenyl)chloroethylenes where the phenyl rings are substituted with fluorine, bromine, or an alkyl group, or with two or more such substituents. These have no observable influence on the procedural steps shown in detail here.

The following examples are supplied to illustrate the process described above for preparing ethers. Parts are by weight.

Example 1

There are mixed 54 parts of 1,1-bis(4-chlorophenyl)-2-chloroethylene and 400 parts of methanol. While this mixture is stirred to hold the chloroethylene in suspension, chlorine is passed in over a 25 minute period until 23 parts has been added. The temperature rises from 31° to 46° C. All of the solid is dissolved when approximately a quarter of the chlorine has been added. The reaction mixture is stirred and cooled to 3° C. A solid separates and is collected by filtering. It is air-dried and amounts to 56 parts, melting at 123°–124° C., and corresponding very closely in composition to methyl α-dichloromethyl-4,4'-dichlorobenzhydryl ether. It contains by analysis 40.4% of chlorine (theory 40.5%).

Example 2

There are mixed 203 parts of 1,1-bis(4-chlorophenyl)-ethylene and 600 parts of methanol. While this mixture is stirred, chlorine is passed in until 61 parts have been supplied. The product is separated by cooling the reaction mixture and filtering. The air-dried solid amounts to 154 parts. It melts at 87°–88° C. and corresponds in composition to methyl α-chloromethyl-4,4'-dichlorobenzhydryl ether. By analysis the product contains 33.7% of chlorine (theory 33.8%.)

As is evident from the above examples the reaction shown herein occurs with either bisphenylethylene or bisphenyl-2-chloroethylene compounds. Any of the designated phenyl substituents may be present, since these phenyl substituents do not enter the reaction.

Example 3

There are mixed 72 parts of 1,1-bis(4-chlorophenyl)-2-chloroethylene and 400 parts of ethanol. The mixture is stirred while 18 parts of chlorine is slowly passed into it. The reaction mixture is stripped under reduced pressure and the residue is distilled under reduced pressure. A fraction of 54 parts is obtained, distilling at 177°–181° C./0.5 mm. This corresponds in composition to ethyl α-dichloromethyl-4,4'-dichlorobenzhydryl ether.

The same method applied to a mixture containing propyl alcohol yields the propyl ether. Substitution of 1,1-bis(4-chlorophenyl)ethylene for the above -2-chloroethylene leads to α-chloromethyl-4,4'-dichlorobenzhydryl ether.

Example 4

A slurry of 58 parts of 1,1-bis(4-chlorophenyl)-2-chloroethylene, 0.5 part of p-toluenesulfonic acid, and 165 parts of n-butanol is stirred while addition is made of 24 parts of tert-butyl hypochlorite. Heat of reaction carries the temperature of the mixture to 82° C. A clear solution results. Stirring is continued for three hours, after which 90 parts of benzene is added. The organic layer is taken and washed with dilute sodium bicarbonate solution and with water. Benzene and excess alcohol are distilled off to give 725 parts (92.5% yield) of n-butyl α-dichloromethyl-4,4'-dichlorobenzhydryl ether.

The apparent boiling point of this product is 152° C./0.15 mm. with decomposition.

The above examples illustrate how any alkyl group from methyl at least to butyl may be introduced to form an ether. The reaction is not, however, confined to alkyl ethers, as will be evident in the following examples.

Example 5

The method of the previous example is applied to 1,1-bis(4-chlorophenyl)-2-chloroethylene and 2-butoxyethanol. A yield of 92.4% of a clear, yellow oil is obtained, corresponding in composition to 2-n-butoxyethyl, α-dichloromethyl-4,4'-dichlorobenzhydryl ether.

Example 6

This same method is applied to 1,1-bis(4-chlorophenyl)-2-chloroethylene and 2-chloroethanol. The product is an oil corresponding in composition to 2-chloroethyl α-dichloromethyl-4,4'-dichlorobenzhydryl ether. It can be distilled at 178°–187° C./0.3 mm.

Example 7

The same method is applied to 2-cyanoethyl alcohol and 1,1-bis(4-chlorophenyl)-2-chloroethylene. An oil is obtained in this case which by analysis consists of 60% of cyanomethyl α-dichloromethyl-4,4'-dichlorobenzhydryl ether and 40% of 1,1-bis(4-chlorophenyl)-2,2-dichloroethylene, formed by decomposition of the said ether.

Equivalent to the α-dichloromethyl group are the bromochloromethyl and the dibromomethyl groups. Thus, chlorine and bromine are equivalent not only with respect to substitution of the phenyl ring, but also with regard to the α-halomethyl group.

Example 8

A mixture of 57 parts of 1,1-bis(4-chlorophenyl)-2-chloroethylene in 300 parts of methanol is treated with 33.5 parts of bromine. There is a reaction with a rise of 8° C. in temperature. Stirring is continued for three hours. The reaction mixture is cooled with separation of a solid, which is filtered off and washed with dilute sodium bicarbonate solution and with hexane. The product, amounting to 57.5 parts is air-dried. It begins to turn red at 108° C. and melts at 115°–116° C. It corresponds in composition to methyl α-bromochloromethyl-4,4'-dichlorobenzhydryl ether.

Example 9

To a solution of 62 parts of 1,1-bis(4-ethylphenyl)-2-chloroethylene and about 0.5 part of p-toluenesulfonic acid monohydrate in 160 parts of methanol there is added 24 parts of tert-butyl hypochlorite. The temperature rises to 50°–55° C. The mixture is stirred for five hours and diluted with 160 parts of benzene. This is treated with sodium bicarbonate solution. The benzene layer is washed with water. Benzene is then distilled off and the product collected by distilling at low pressure. At 148°–157° C./0.1–0.2 mm. a main fraction of 42.5 parts is taken which corresponds in composition to methyl α-dichloromethyl-4,4'-diethylbenzhydryl ether.

In the same way other bis(alkylphenyl)ethylene compounds can be converted to the ethers of the corresponding benzhydrols.

Example 10

A mixture is prepared from 23 parts of 1,1-bis(4-methoxyphenyl)-2-chloroethylene and 400 parts of methanol. Chlorine is run into this mixture until eight parts have been added. The reaction mixture is added to 1000 parts of cold water. An oil separates and is taken up in benzene. The benzene extract is washed with water. The benzene is distilled off leaving an oil in an amount of 23 parts. This corresponds in composition to methyl α-dichloromethyl-4,4'-dimethoxybenzhydryl ether. Analysis of this oil gave the following values: carbon, 60.5%; hydrogen, 5.4%; and chlorine, 20.5%. Theoretical values are 60.1%, 5.33%, and 20.8%, respectively.

Alkyl α-chloromethyl benzhydryl ethers including the dichloromethyl derivatives can be cleaved to yield the corresponding carbinols. A convenient method for accomplishing this purpose is to heat the ether with acetic acid and hydrochloric acid. The ethers are stable to alkaline conditions whereas the carbinols are not. This prevents use of the Williamson reaction to form ethers from the carbinol. Also, since other conventional ether-forming reactions are not applicable to the conversion of carbinols to ethers, the process here claimed and described becomes of particular importance.

The ethers of this invention are active toxic agents against mites. While they are somewhat slower in action than the corresponding carbinols, they nevertheless over a period of time give as good kills of mites. They have the advantage of being somewhat safer to use from the point of view of phytotoxicity.

The methyl ethers are of particular importance as they act in a peculiar way suggesting vapor phase action. The methyl ethers are also effective fly toxicants.

In standard tests against red spiders methyl α-dichloromethyl-4,4'-dichlorobenzhydryl ether applied from an aqueous spray at 1:800 and 1:1600 gave 100% and 95% kill respectively after 72 hours. In a similar test methyl α-chloromethyl-4,4'-dichlorobenzhydryl ether gave kills of 100% even at 1:3200. It also showed favorable ovicidal action.

For the application of the ethers of this invention to plants they may be formulated as emulsifiable concentrates or as wettable powders or they may be dispersed in dusts. In one useful formulation 25 parts of one or more of the ethers, 5 parts of emulsifying agent, and 70 parts of solvent are combined to give a liquid product which is readily dispersed with stirring in water to provide a spray. The emulsifier here may be any solvent-soluble agent, particularly one such as an alkylphenoxypolyethoxyethanol or similar reaction product of ethylene oxide and a long-chained alcohol, mercaptan, carboxylic acid, or amine. The solvent may be a hydrocarbon such as methylated naphthalene, toluene, xylene, or an aromatic naphtha.

A typical wettable powder may be made from 25 parts of one or more of the ethers of this invention, 60 parts of a clay, 10 parts of magnesium carbonate, 3 parts of partially desulfonated lignin, and 2 parts of an alkylphenoxypolyethoxyethanol. This powder is diluted with water and sprayed onto plants to control mites thereon. Dusts may be similarly prepared with omission of wetting agent. Other conventional solids may be substituted for the above, including pyrophyllite, talc, diatomaceous earth, calcium carbonate, etc.

Initial kills of mites as a result of application of an ether of this invention are very good, particularly after 72 hours. For example, methyl α-dichloromethylbenzhydryl ether gives a kill of 100% when applied at a dilution of 1:800. Methyl α-chloromethyl-4,4'-dichlorobenzhydryl ether gives 100% kill at 1:400, 1:800, and 1:3200 dilutions. Methyl α-dichloromethyl-4,4'-dichlorobenzhydryl ether at 1:800 gives a 100% kill and at 1:1600 gives a 95–100% kill. Ethyl α-dichloromethyl-4,4'-dichlorobenzhydryl ether gives a kill of 100% at 1:800 and 1:1600 and a 74% kill at 1:3200.

These compounds have highly effective residual killing action as well as initial kill. They thus protect plants over a matter of weeks from one application.

We claim:

1. A process for preparing compounds of the structure

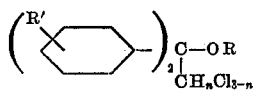

which comprises reacting chlorine and an ethylenic compound of the formula

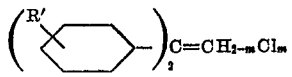

in the presence of an alkanol, ROH, R' being a member of the class consisting of fluorine, chlorine, bromine, hydrogen, alkyl groups of not over four carbon atoms, and alkoxy groups of not over four carbon atoms, R being a member of the class consisting of primary alkyl and secondary alkyl groups of not over four carbon atoms, $n$ is an integer from one to two, and $m$ is a number from zero to one.

2. A process for preparing compounds of the structure

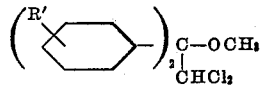

which comprises reacting chlorine and a compound of the formula

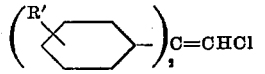

in the presence of methanol, R' being a member of the class consisting of fluorine, chlorine, bromine, hydrogen, alkyl groups of not over four carbon atoms, and alkoxy groups of not over four carbon atoms.

3. A process for preparing methyl α-dichloromethyl-4,4'-dichlorobenzhydryl ether which comprises reacting chlorine and 1,1-bis(4-chlorophenyl)-2-chloroethylene in the presence of methanol.

4. A process for preparing methyl α-chloromethyl-4,4'-dichlorobenzhydryl ether which comprises reacting chlorine and 1,1-bis(4-chlorophenyl)ethylene in the presence of methanol.

5. A process for preparing methyl α-dichloromethyl-4,4'-diethylbenzhydryl ether which comprises reacting chlorine and 1,1-bis(4-ethylphenyl)-2-chloroethylene in the presence of methanol.

References Cited in the file of this patent

UNITED STATES PATENTS

| | | |
|---|---|---|
| 2,430,586 | Ruthruff et al. | Nov. 11, 1947 |
| 2,573,080 | Wilkinson et al. | Oct. 30, 1951 |
| 2,654,688 | Haefliger | Oct. 6, 1953 |

OTHER REFERENCES

Lipp et al.: Berichte, vol. 56 (1923), p. 570 (1 page) (Abstracted in Chem. Abstracts, vol. 17 (1923) pp. 1457–1458 (2 pages)).

March et al.: Pest Control, vol. 20, p. 16 (1952), 1 page.